United States Patent
Knapp et al.

[11] Patent Number: 5,939,609
[45] Date of Patent: Aug. 17, 1999

[54] MULTI-USE SENSOR HAVING A CONTROLLABLE NUMBER OF MEASUREMENT CYCLES

[75] Inventors: Terry R. Knapp, Longmont; Robert B. Smith, Loveland, both of Colo.

[73] Assignee: Conception Technology Incorporated, Fort Collins, Colo.

[21] Appl. No.: 09/046,220

[22] Filed: Mar. 23, 1998

[51] Int. Cl.$^6$ .................................................. G01N 1/00
[52] U.S. Cl. .................................................................. 73/1.01
[58] Field of Search .................................. 73/1.01, 1.02; 377/15, 16; 340/501, 635

[56] References Cited

U.S. PATENT DOCUMENTS 4,890,306 12/1989 Noda ........................................ 377/15
5,582,696 12/1996 Sheehan .

*Primary Examiner*—Robert Raevis
*Attorney, Agent, or Firm*—Duft, Graziano & Forest, P.C.

[57] ABSTRACT

The multi-use sensor has a controllable number of measurement cycles. This multi-use sensor consists of a sensor and/or electrodes that are encased in a suitable material to allow reuse of the sensor and sensor life cycle circuitry that functions to regulate the number of operational cycles that the sensor can execute to ensure that the multi-use sensor is not used beyond its effective life. Included in this life cycle circuitry is a dual state mechanism that is connected across two conductors and that has a first state of low impedance. There is sensor state change apparatus that changes the state of the dual state mechanism to a second state of high impedance, such as an open circuit between the two conductors. The sensor state change apparatus determines the state of the dual state mechanism and, if the dual state mechanism is in the first state, it applies a control signal to the dual state mechanism to switch this mechanism into the second state upon activation of the multi-use sensor to perform a measurement. Once the dual state mechanism is in the second state, a processor maintains a count of the number of times that the multi-use is operated to perform a measurement. Once the maintained count reaches a predetermined count, the processor disables the multi-use sensor to prevent it from being used beyond its predetermined useful life.

15 Claims, 2 Drawing Sheets

MULTI-USE SENSOR HAVING A CONTROLLABLE NUMBER OF MEASUREMENT CYCLES

FIELD OF THE INVENTION

This invention relates to multi-use sensors that are used to measure predetermined variables and, in particular, to a disposable multi-use sensor that has a controllable number of operating cycles to ensure that the multi-use sensor is not used beyond its useful life.

PROBLEM

It is a problem in the field of disposable sensors to manufacture a sensor that performs its measurements in an accurate and safe manner for the duration of the life of the sensor. In particular, every sensor suffers from degradation in its performance over the course of its useful life due to wear and aging of the elements that are used to implement the sensor. There is typically a predetermined operating range for a sensor in that the operates in an acceptable manner, in terms of accuracy of the measurements that are performed, for a reasonable number of measurement cycles. As the sensor is used beyond this recommended number of measurement cycles, each successive measurement cycle increases the probability that the measurements performed by the sensor have exceeded the accuracy limits that are acceptable. However, there is presently no sensor that can limit the number of measurement cycles that it can perform.

In the field of medical monitoring systems, the traditional measurement paradigm was that of a professional medical practitioner performing measurements of a patient's physiological characteristics in a controlled environment. It was in the best interest of the professional medical practitioner to perform these measurements in the most accurate manner. Therefore, the measurements were either performed with single use disposable sensors or with multi-use sensors that were precisely maintained by the professional medical practitioner and/or trained technical support staff. This environment reduced the probability that the disposable multi-use sensor was used beyond its useful life and ensured that inaccurate measurements by the sensor were likely to be detected and the sensor replaced at that point. Thus, the professional users of the sensors performed the quality determination in the life of the disposable multi-use sensors.

However, the new paradigm in the field of medical monitoring systems is for patients to perform their own measurements to reduce the cost and inconvenience of scheduling an appointment with a professional medical practitioner. The resolution of the issue of sensor accuracy has been to make the sensors single use disposable elements. However, to make such sensors cost effective for the single use life span, the complexity and accuracy of the sensor must be limited to a level that is commensurate with the value delivered to the patient in terms of convenience and necessity to perform the measurements. However, it is desirable in many applications to provide a disposable multi-use sensor that has a complexity and cost that necessitates its use by a patient for a significant number of measurement cycles to make the sensor both sufficiently accurate and cost effective. However, the absence of the professional medical practitioner in this paradigm eliminates the above-mentioned method of limiting the useful life of the disposable multi-use sensor. It is expected that many patients continue to use the same disposable multi-use sensor well beyond the useful life of such a device, with a commensurate reduction in the accuracy of the measurements being performed. This defeats the purpose of making the multi-use sensor a high accuracy device and renders the set of measurements taken by the patient increasingly less accurate and potentially misleading to the user and/or the professional medical practitioner who relies on this data the make a diagnosis and treatment plan for this patient. In a medical monitoring environment, such misleading or erroneous data can have catastrophic life threatening consequences. Unfortunately, there is presently no effective mechanism to resolve this problem.

Therefore, there is presently no effective way of ensuring that the multi-use sensors used by patients are replaced in a timely manner to thereby maintain the accuracy of the measurements taken by the multi-use sensor.

SOLUTION

The above described problems are solved and a technical advance achieved in the field by the present multi-use sensor that has a controllable number of measurement cycles. This multi-use sensor consists of a sensor element and/or electrodes that are encased in a suitable material to allow reuse of the multi-use sensor in the environment for which the multi-use sensor is designed. The multi-use sensor may include life cycle circuitry within the multi-use sensor that comprises a processor, counter and a source of power to enable the operation of this circuitry. This life cycle circuitry functions to regulate the number of operational cycles that the multi-use sensor can execute to ensure that the multi-use sensor is not used beyond its effective life. Alternatively, elements of the life-cycle circuitry governing the multi-use sensor may be included in the electronics of a base unit to which the multi-use sensor is attached or has an electronic interface. Included in this life cycle circuitry is a dual state mechanism that is connected across two conductors and that has a first state of low impedance. There is sensor state change apparatus that changes the state of the dual state mechanism to a second state of high impedance, such as an open circuit between the two conductors. The sensor state change apparatus determines the state of the dual state mechanism and, if the dual state mechanism is in the first state, it applies a control signal to the dual state mechanism to switch this mechanism into the second state upon activation of the multi-use sensor to perform a measurement. Once the dual state mechanism is in the second state, a processor maintains a count of the number of times that the multi-use sensor is operated to perform a measurement. Once the maintained count reaches a predetermined count, the processor disables the multi-use sensor to prevent it from being used beyond its predetermined useful life.

Thus, the multi-use sensor enables the user to perform only a predetermined number of measurement cycles to thereby ensure that the user cannot use the multi-use sensor beyond its useful life. This mechanism prevents the use of the multi-use sensor when the multi-use sensor no longer can provide the accuracy that is required for effective operation of the multi-use sensor.

DETAILED DESCRIPTION

Figure 1:
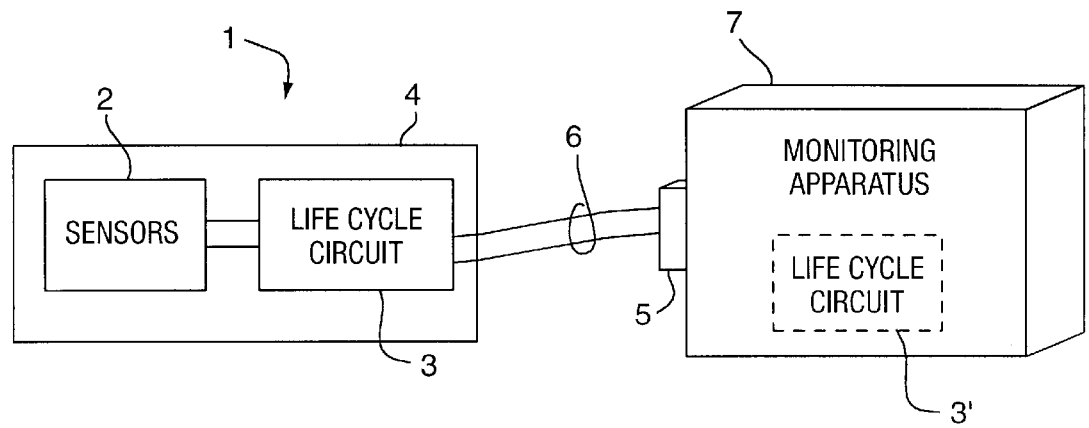
FIG. 1 illustrates in block diagram form the overall architecture of the present multi-use sensor that has a controllable number of measurement cycles.
Figure 3:
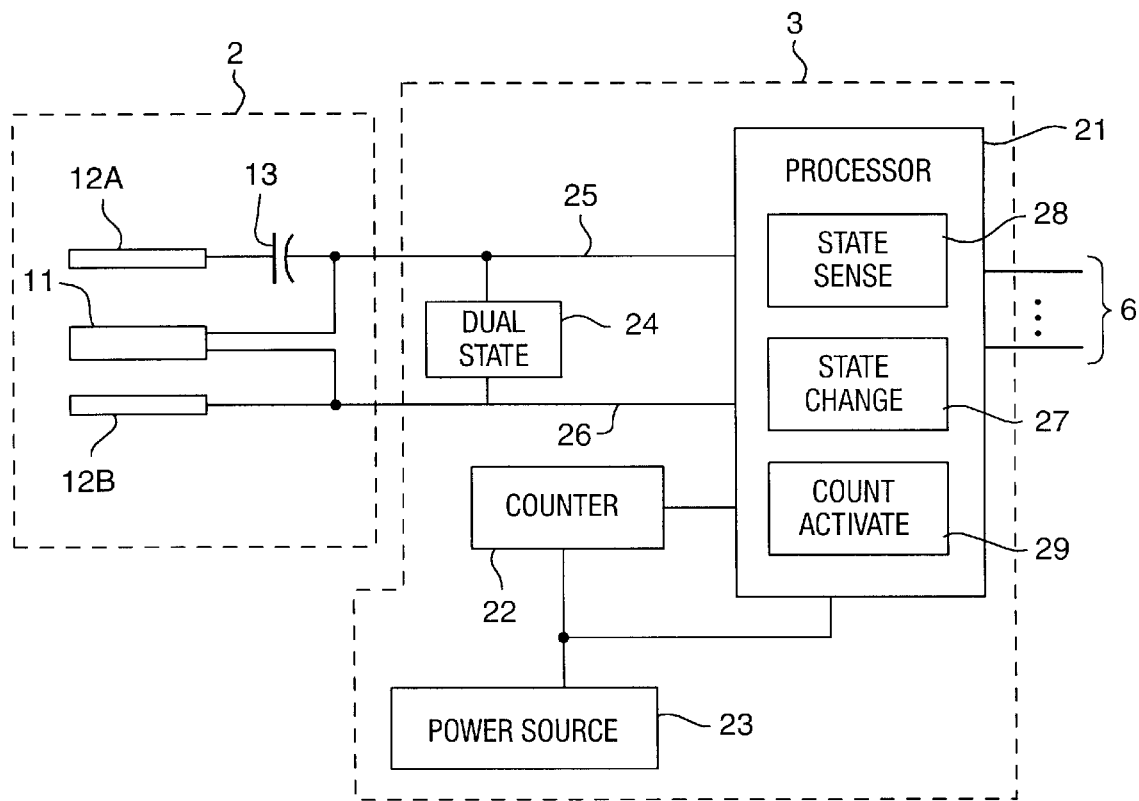
FIG. 3 illustrates additional details of the present multi-use sensor that has a controllable number of measurement cycles.

FIG. 1 illustrates in block diagram form the overall architecture of the present multi-user sensor while FIG. 3 illustrates additional details of the multi-use sensor. The multi-use sensor 1 consists of a sensor module 2 and a life cycle circuit 3 that are encased in a housing 4 that is constructed of a suitable material to allow reuse of the sensor 1 in the environment for which the sensor is designed. The sensor module 2 comprises at least one and more typically a plurality of sensor elements, that are used to perform the desired measurements. The multi-use sensor 1 is typically connected to a monitoring apparatus 7 via a connector 5 that serves to present a plurality of conductors 6 of the multi-use sensor 1 for connection to the monitoring apparatus 7. The multi-use sensor 1 therefore represents the instrumentality that includes the active and passive sensor elements used to perform the desired measurements and has a predefined usable life in terms of the reliability of the sensor elements contained therein. Alternately, the life cycle circuit 3' may exist within the monitoring apparatus 7. The choice of configuration is determined by cost of disposable elements, desired physical size of the multi-use sensor 1, and the nature of the environment in which the multi-use sensor 1 is to be used. There are many measurement applications that can be served by such an architecture, such as medical monitoring applications. The implementation of the present multi-use sensor 1 is partially determined by the particular application of this apparatus and the following description therefore represents one of the many possible embodiments of this multi-use sensor architecture.

Architecture of the Multi-use Sensor

As shown in FIG. 3, the multi-use sensor 1 includes a life cycle circuit 3 that comprises a processor 21, counter 22, an optional source of power 23, and a dual state mechanism 24. Included in the life cycle circuit 3 are a number of functional elements that can be implemented as either hardware or software. For the sake of this description, these elements are illustrated as part of the processor 21, although they can be separate functional circuits. These additional elements comprise sensor state sense apparatus 28, state change apparatus 27, count activate apparatus 29 which operate on the counter 22 and dual state mechanism 24 to perform the life cycle management function. The life cycle circuit 3 functions to regulate the number of operational cycles that the multi-use sensor 1 can execute to ensure that the multi-use sensor 1 is not used beyond its effective life. While all of the elements that comprise life cycle circuit 3 are illustrated as being an integral element of the disposable multi-use sensor 1, it is envisioned that some or all of these elements may be incorporated in the associated monitoring apparatus 7. For example, the processor 21 and counter 22 can be part of the monitoring apparatus 7. The present description renders the multi-use sensor 1 self-defining, in that the operation of the described apparatus is not dependent on the interconnection with a particular monitoring apparatus.

The dual state mechanism 24, connected across two conductors 25, 26, has a first state comprising a low impedance condition and a second state comprising a high impedance condition. There is state change apparatus 27 that changes the state of the dual state mechanism 24 from the first state to the second state, such as operating a fuse to switch its state from a low impedance conductive condition to an open circuit between the two conductors 25, 26. In operation, when the multi-use sensor 1 is activated, state sense apparatus 28 determines the state of the dual state mechanism 24 and, if the dual state mechanism 24 is in the first state, it activates the state change apparatus 27 to apply a control signal to the dual state mechanism 24 to switch this mechanism into the second state upon activation of the multi-use sensor 1 to perform a measurement. Once the dual state mechanism 24 is in the second state, the processor 21 maintains a count of the number of times that the multi-use sensor 1 is operated to perform a measurement. The use count process is activated by the count activation apparatus 29 in cooperation with the state sense apparatus 28. Once the maintained count reaches a predetermined count, the processor 21 disables the multi-use sensor 1 to prevent it from being used beyond its predetermined useful life.

Operation of the Multi-use Sensor

Figure 2:
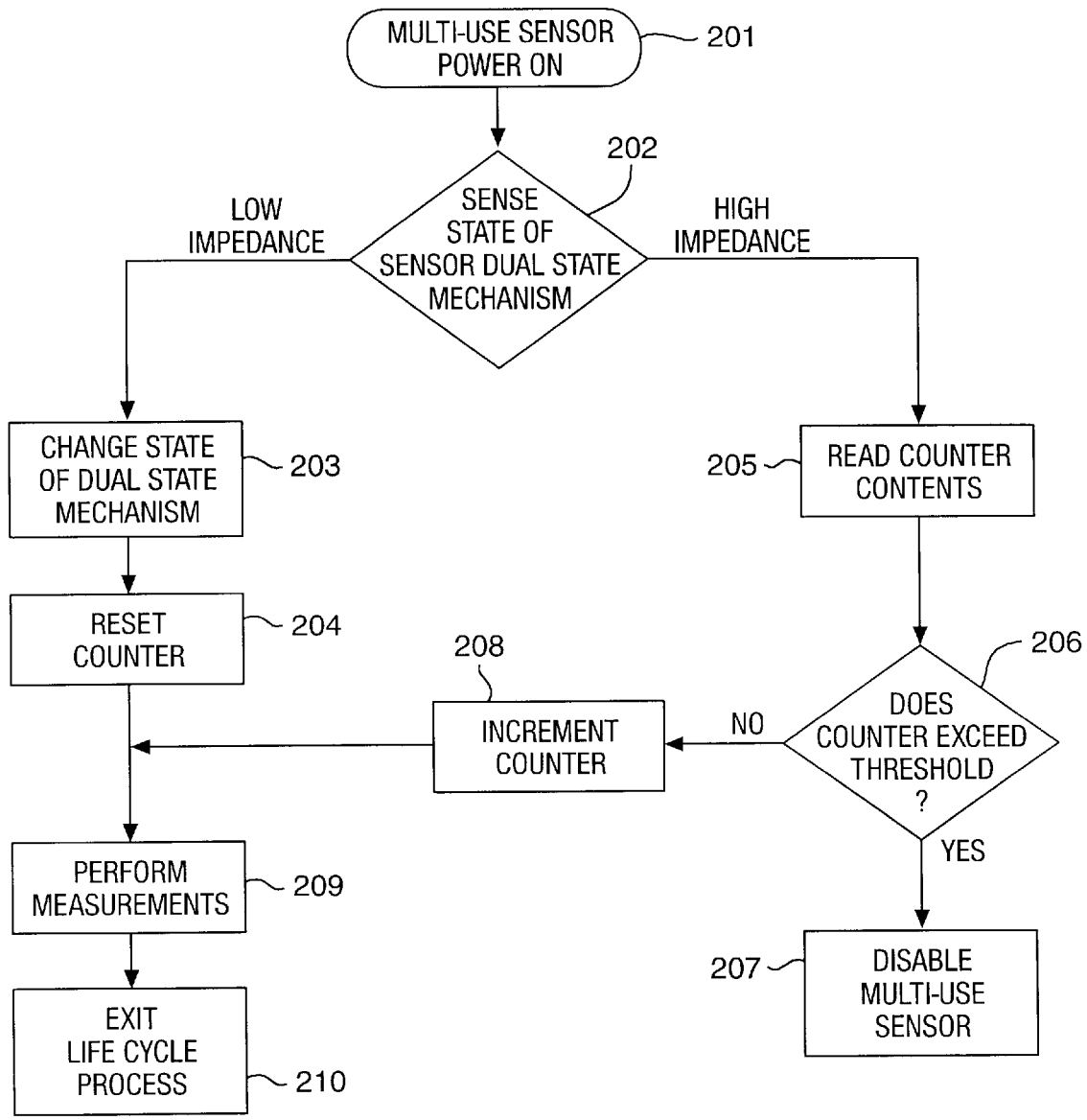
FIG. 2 illustrates in flow diagram form the operation of the present multi-use sensor that has a controllable number of measurement cycles.

FIG. 2 illustrates in flow diagram form the operation of the present multi-use sensor 1 that has a controllable number of measurement cycles. The multi-use sensor 1 activates the predetermined life function of the multi-use sensor 1 at step 201 by entering the life cycle determination process in response to the multi-use sensor 1 and/or monitoring apparatus 7 being powered on. The state sense apparatus 28 at step 202 applies a state sense signal to the dual state mechanism 24 to determine the "high impedance" or "low impedance" state of the dual state mechanism 24. A "low impedance" state of the dual state mechanism 24 indicates that a fusible link or analogous low impedance dual state mechanism exists across the two conductors 25, 26. If it is determined at step 202 that a "low impedance" state exists, the state sense apparatus 28 activates the state change apparatus 27 at step 203 to send a signal to the dual state mechanism 24 of sufficient magnitude to disrupt the fusible link. When a "low impedance" state exists in the dual state mechanism 24, the counter 22 is reset at step 204 to allow a predetermined number of readings or measurements to be taken in the "high impedance" state, thus predetermining the life of the multi-use sensor 1.

If, at power on, the state sense apparatus 28 detects the "high impedance" state of the dual state mechanism 24, it enables normal measurements to take place unless the counter 22 has reached its predetermined limit for the number of measurements allowed since the last encounter with a "low impedance" state. The state sense apparatus 28, in response to a high impedance determination at step 202, reads the value of the accumulated count at step 205. If the count stored in the counter 22 is determined at step 206 to exceed the predetermined threshold, at step 207 the multi-use sensor 1 is disabled and an error message displayed by the multi-use sensor 1, or more typically on monitoring apparatus 7 until a new multi-use sensor 1 is connected thereto at step 207 and the process returns to step 202. The multi-use sensor disabling can comprise processor 21 transmitting a control signal to monitoring apparatus 7 to abort the measurement process or can include the blocking of signal transmission between the sensor elements 11, 12 and the monitoring apparatus 7.

If at step 206 it is determined that the accumulated count does not exceed the predetermined threshold, then processing advances to step 208 where the count stored in counter 22 is incremented and the desired measurements are enabled at step 209. When the power is removed from the multi-use sensor 1, the process resets at step 210 until the next power up for a measurement, when the life cycle process is reinitialized to step 201 as described above.

Embodiment of the Multi-use Sensor

The present multi-use sensor 1 is designed to measure specific variables and one such application of the multi-use sensor 1 is the measurement of changes in the chemistry of the vaginal/paracervical region of human females. A detachable/disposable vaginal sensor tip is designed to: reduce the cost of manufacture, prevent measurement drift due to aging and contamination, reduce the constraints on cleaning and sanitizing and reduce the exposure of subjects to bacterial contamination or transfer. This multi-use sensor 1 contains circuitry to make two types of measurements: 1.) an AC conductance measurement of body fluids and surrounding tissues 2.) A temperature measurement of the subject at the tip of the multi-use sensor 1. Other measurement elements could be included, but are not illustrated for the purpose of simplicity of description. The AC conductance measurement is effected by the processor 21, or the monitoring apparatus 7, applying an AC signal of appropriate voltage and frequency to the electrodes 12A, 12B via conductors 25, 26 and capacitor 13. The temperature measurement is accomplished by use of the temperature sensor 11 which is a passive temperature sensitive device, such as a thermistor, that changes its impedance characteristics as a function of temperature. The processor 21, or the monitoring apparatus 7, measures the impedance of the temperature sensor 11 by the application of a DC signal of appropriate magnitude to conductors 25, 26 and the measurement of the resultant DC current. The multi-use sensor 1 includes the dual state mechanism 24 that, in this embodiment, comprises a current sensitive element, such as a fusible link, that switches from a low impedance state to a high impedance state when sufficient current or voltage is applied across the device's electrical terminals.

SUMMARY

The present multi-use sensor has a controllable number of measurement cycles. This multi-use sensor consists of sensor element(s) and/or electrodes that are encased in a suitable material to allow reuse of the multi-use sensor in the environment for which the multi-use sensor is designed. The multi-use sensor also includes life cycle circuitry within the multi-use sensor that functions to regulate the number of operational cycles that the sensor can execute to ensure that the multi-use sensor is not used beyond its effective life. Thus, the multi-use sensor enables the user to perform only a predetermined number of measurement cycles to thereby ensure that the user cannot use the multi-user sensor beyond its useful life. This mechanism prevents the use of the multi-use sensor when the no longer can provide the accuracy that is required for effective operation of the multi-use sensor.

What is claimed:

1. A multi-use sensor having a controllable number of operational cycles, comprising:

sensor state identification means having a first state and a second state, each of said first and said second states having measurable characteristics, with said sensor state identification means being switchable only from said first state to said second state;

means, responsive to said sensor state identification means being in said second state, for counting a number of uses of said multi-use sensor; and means for disabling said multi-use sensor when said counted number of uses reaches a predetermined count.

2. The multi-use sensor of claim 1 further comprising:

means for sensing a state of said sensor state identification means; and means, responsive to said means for sensing determining that said sensor state identification means is in said first state, for effecting change of said sensor state identification means from said first state to said second state in response to a first use of said multi-use sensor.

3. The multi-use sensor of claim 2 wherein said sensor state identification means comprises:

impedance means capable of being switched from a first state of low impedance to a second state of high impedance.

4. The multi-use sensor of claim 3 wherein said impedance means comprises:

fusible link means, connected between first and second conductors to form a low impedance path between said first and second conductors and responsive to said means for effecting applying a signal of predetermined magnitude to said first and said second conductors, for removing said low impedance path between said first and second conductors.

5. The multi-use sensor of claim 1 further comprising:

means for performing a predetermined set of measurements.

6. The multi-use sensor of claim 1 wherein said means for counting comprises:

means for generating a signal each time said multi-use sensor is activated; and means for incrementing a count in a counter each time said means for generating generates said signal.

7. A method of operating a multi-use sensor to provide a controllable number of operational cycles of the multi-use sensor, comprising the steps of:

determining a state of a sensor state identification apparatus that has a first state and a second state, each of said first and said second states having measurable characteristics, with said sensor state identification apparatus being switchable only from said first state to said second state;

counting, in response to said sensor state identification apparatus being in said second state, a number of uses of said multi-use sensor; and disabling said multi-use sensor when said counted number of uses reaches a predetermined count.

8. The method of claim 7 further comprising the steps of:

sensing a state of said sensor state identification apparatus; and effecting, in response to a determination that said sensor state identification apparatus is in said first state, change of said sensor state identification apparatus from said first state to said second state in response to a first use of said multi-use sensor.

9. The method of claim 7 further comprising the step of:

performing a predetermined set of measurements.

10. The method of claim 7 wherein said sensor state identification apparatus comprises an impedance apparatus capable of being switched from a first state of low impedance to a second state of high impedance, said step of effecting comprises:

applying a signal of predetermined magnitude to said impedance apparatus to switch said impedance apparatus from said first state of low impedance to said second state of high impedance.

11. The method of claim 7 wherein said step of counting comprises:

generating a signal each time said multi-use sensor is activated; and incrementing a count in a counter each time said step of generating generates said signal.

12. A multi-use sensor having a controllable number of operational cycles, comprising:

sensor state identification means having a first state and a second state, each of said first and said second states having measurable characteristics;

means for sensing a state of said sensor state identification means;

means, responsive to said means for sensing determining that said sensor state identification means is in said first state, for effecting change of said sensor state identification means from said first state to said second state in response to a first use of said multi-use sensor;

means, responsive to said sensor state identification means being in said second state, for counting a number of uses of said multi-use sensor;

means for disabling said multi-use sensor when said counted number of uses reaches a predetermined count; and wherein said sensor state identification means comprises:
fusible link means, capable of being switched from a first state of low impedance to a second state of high impedance, connected between first and second conductors to form a low impedance path between said first and second conductors and responsive to said means for effecting applying a signal of predetermined magnitude to said first and said second conductors, for removing said low impedance path between said first and second conductors.

13. The multi-use sensor of claim 12 further comprising:

means for sensing a state of said sensor state identification means; and means, responsive to said means for sensing determining that said sensor state identification means is in said first state, for effecting change of said sensor state identification means from said first state to said second state in response to a first use of said multi-use sensor.

14. The multi-use sensor of claim 12 further comprising:

means for performing a predetermined set of measurements.

15. The multi-use sensor of claim 12 wherein said means for counting comprises:

means for generating a signal each time said multi-use sensor is activated; and means for incrementing a count in a counter each time said means for generating generates said signal.

* * * * *